US011381079B1

(12) United States Patent
Khan et al.

(10) Patent No.: US 11,381,079 B1
(45) Date of Patent: Jul. 5, 2022

(54) SYSTEM FOR PROTECTING ELECTROMECHANICAL SWITCHGEARS AND PROTECTION CIRCUITS IN HIGH-VOLTAGE APPLICATIONS

(71) Applicant: LEACH INTERNATIONAL CORPORATION, Buena Park, CA (US)

(72) Inventors: Imtiaz Ahmad Khan, Trabuco Canyon, CA (US); Anhtai Le Tran, Garden Grove, CA (US); Kyle Richard Cantu, Santa Fe Springs, CA (US)

(73) Assignee: LEACH INTERNATIONAL CORPORATION, Buena Park, CA (US)

( * ) Notice: Subject to any disclaimer, the term of this patent is extended or adjusted under 35 U.S.C. 154(b) by 0 days.

(21) Appl. No.: 17/159,753

(22) Filed: Jan. 27, 2021

(51) Int. Cl.
*H02H 9/04* (2006.01)

(52) U.S. Cl.
CPC .................. *H02H 9/045* (2013.01)

(58) Field of Classification Search
CPC ...................................... H02H 9/045
USPC ............................................. 361/11
See application file for complete search history.

(56) References Cited

U.S. PATENT DOCUMENTS

| | | | |
|---|---|---|---|
| 4,685,019 A | 8/1987 | Needham | |
| 6,340,878 B1 | 1/2002 | Oglesbee | |
| 7,206,178 B2 | 4/2007 | Friedrichs et al. | |
| 7,369,387 B2 * | 5/2008 | Harris | H02H 5/042 361/103 |
| 8,619,397 B2 | 12/2013 | Mikolajczak | |
| 8,810,991 B2 | 8/2014 | Scharnick | |
| 9,373,473 B2 | 6/2016 | Dupraz et al. | |
| 9,893,057 B2 | 2/2018 | Huerner et al. | |
| 9,998,117 B2 * | 6/2018 | Du | H01C 7/02 |
| 2006/0171088 A1 | 8/2006 | Carcouet et al. | |
| 2017/0170824 A1 | 6/2017 | Du et al. | |
| 2018/0248353 A1 | 8/2018 | Creech | |
| 2020/0021108 A1 | 1/2020 | Boesche et al. | |
| 2020/0152407 A1 | 5/2020 | Askan | |

FOREIGN PATENT DOCUMENTS

| | | |
|---|---|---|
| EP | 1 681 694 B1 | 7/2006 |
| EP | 3 051 643 A1 | 8/2016 |
| EP | 3 373 317 A1 | 9/2018 |
| JP | 2005-19106 | 1/2005 |
| WO | WO 00/24105 | 4/2000 |

OTHER PUBLICATIONS

International Search Report and Written Opinion issued in corresponding application No. PCT/US2021/015281, dated Oct. 28, 2021, 15 pages.

\* cited by examiner

*Primary Examiner* — Kevin J Comber
(74) *Attorney, Agent, or Firm* — Lewis Roca Rothgerber Christie LLP

(57) ABSTRACT

An electromechanical switching protection system includes an electromechanical switchgear having contacts configured to selectively open and close in response to a control signal, and a junction field effect transistor (JFET) device electrically connected in series with the electromechanical switchgear between an input terminal and an output terminal of the electromechanical switching protection system, a gate of the JFET device being electrically connected to the output terminal.

14 Claims, 4 Drawing Sheets

SYSTEM FOR PROTECTING ELECTROMECHANICAL SWITCHGEARS AND PROTECTION CIRCUITS IN HIGH-VOLTAGE APPLICATIONS

FIELD

Aspects of embodiments of the present disclosure are generally related to switchgears and electromechanical protection devices.

BACKGROUND

Switchgears are commonly used for controlling and switching on or off electrical circuits in electrical power systems. Examples of switchgear devices may include electromechanical switches/relays, fuses, circuit breakers, isolators, current and potential transformers, etc.

Electromechanical switchgears are generally designed to operate at a certain voltage. They can be permanently damaged when subjected to a voltage higher than their normal rating. The damage is often caused by arcing and fretting of contact material, and may eventually lead to catastrophic failure due to sustained arcing.

An electric arc may occur when current-carrying contacts of a switch/relay are separated (i.e., when contacts are opened under load). When the voltage across the contacts is sufficiently high, the air molecules across the gap between the separating contacts may ionize. The generated plasma may have a low enough electrical resistance to sustain electron flow even with the separation distance between the contacts steadily increasing. The resulting electrical discharge is known as an electric arc. The arcing may result in pitting and fretting of the contact material, which in turn results in increased contact resistance and reduced life. A switchgear may be sized for a particular rated voltage, and when higher voltage is applied, the gap may not be large enough to break the arc, thus resulting in damage, and even failure, of the switchgear.

The above information disclosed in this Background section is only for enhancement of understanding of the present disclosure, and therefore it may contain information that does not form the prior art that is already known to a person of ordinary skill in the art.

SUMMARY

Aspects of embodiments of the present disclosure are directed to a system for protecting electromechanical switchgears and protection circuits against high voltage arcs that may occur in high voltage applications. In some embodiments, a high-voltage electromechanical switching protection system utilizes a power semiconductor for limiting the voltage across a switchgear or a protection system, thus effectively increasing the power-rating of the switching protection system.

According to some embodiments of the present disclosure, there is provided an electromechanical switching protection system including: an electromechanical switchgear having contacts configured to selectively open and close in response to a control signal; and a junction field effect transistor (JFET) device electrically connected in series with the electromechanical switchgear between an input terminal and an output terminal of the electromechanical switching protection system, a gate of the JFET device being electrically connected to the output terminal.

In some embodiments, the JFET device is configured to reduce electrical arcing across the contacts of the electromechanical switchgear when opening or closing.

In some embodiments, the JFET device is configured to limit a voltage across the contacts of the electromechanical switchgear to a gate-source off-voltage of the JFET device.

In some embodiments, the JFET device is configured to be activated prior to the contacts of the electromechanical switchgear being opened, and to be deactivated after the contacts of the electromechanical switchgear are opened.

In some embodiments, the JFET device is configured to be deactivated prior to the contacts of the electromechanical switchgear being closed, and to be activated after the contacts of the electromechanical switchgear are closed.

In some embodiments, the JFET device includes an N-channel JFET.

In some embodiments, the JFET device has a higher voltage rating than the electromechanical switchgear.

According to some embodiments of the present disclosure, there is provided an electromechanical switching protection system including: an electromechanical switchgear having contacts configured to selectively open and close in response to a control signal; and a junction field effect transistor (JFET) device electrically connected in series with the electromechanical switchgear between an input terminal and an output terminal of the electromechanical switching protection system, a gate of the JFET device being electrically connected to the input terminal.

In some embodiments, the JFET device is configured to reduce electrical arcing across the contacts of the electromechanical switchgear when opening or closing.

In some embodiments, the JFET device is configured to limit a voltage across the contacts of the electromechanical switchgear to a gate-source off-voltage of the JFET device.

In some embodiments, the JFET device is configured to be activated prior to the contacts of the electromechanical switchgear being opened, and to be deactivated after the contacts of the electromechanical switchgear are opened.

In some embodiments, the JFET device is configured to be deactivated prior to the contacts of the electromechanical switchgear being closed, and to be activated after the contacts of the electromechanical switchgear are closed.

In some embodiments, the JFET device includes a P-channel JFET.

In some embodiments, the JFET device has a higher voltage rating than the electromechanical switchgear.

According to some embodiments of the present disclosure, there is provided an electromechanical switching protection system including: an electromechanical protection circuit configured to interrupt current flow through the electromechanical switching protection system in response to a fault being detected; and a junction field effect transistor (JFET) device electrically connected in series with the electromechanical protection circuit between an input terminal and an output terminal of the electromechanical switching protection system, a gate of the JFET device being electrically connected to the output terminal.

In some embodiments, the electromechanical protection circuit includes a circuit breaker or a fuse.

In some embodiments, the JFET device is configured to limit a voltage across terminals of the electromechanical protection circuit to a gate-source off-voltage of the JFET device.

In some embodiments, the JFET device includes an N-channel JFET.

BRIEF DESCRIPTION OF THE DRAWINGS

The accompanying drawings, together with the specification, illustrate example embodiments of the present disclosure, and, together with the description, serve to explain the principles of the present disclosure.

DETAILED DESCRIPTION

The detailed description set forth below is intended as a description of example embodiments of a system and method for defect detection, provided in accordance with the present disclosure, and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Aspects of embodiments of the present disclosure are directed to a high-voltage electromechanical switching protection system utilizing a power semiconductor for limiting the voltage across a switchgear or a protection system, thus effectively increasing the power-rating of the switching protection system. In some embodiments, the power semiconductor is a junction field effect transistor (JFET).

Figure 1A:
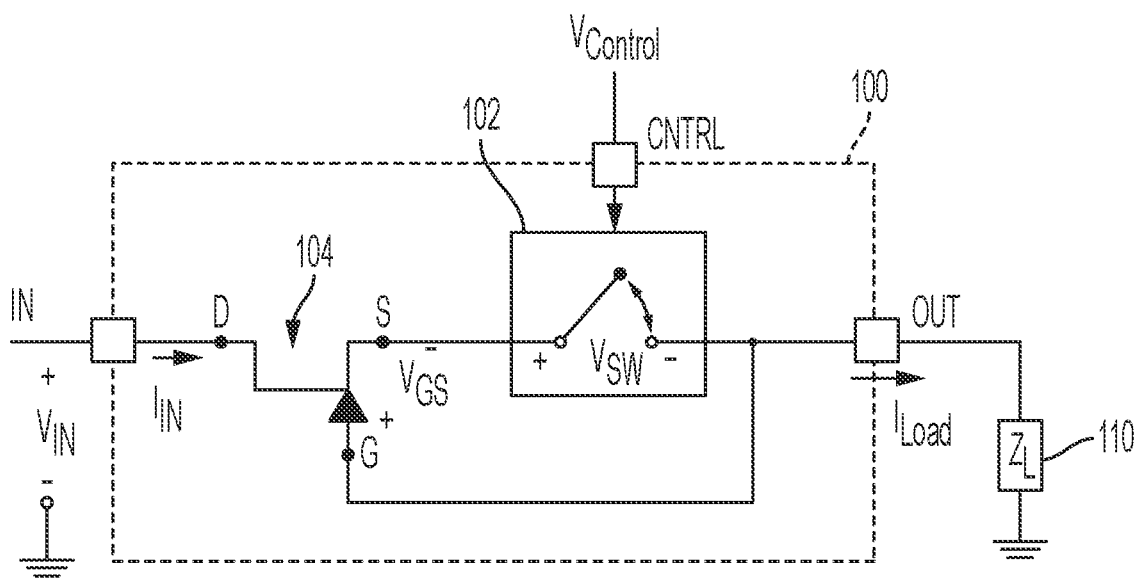
FIG. 1A illustrates a high-voltage electromechanical switching protection system including an n-channel junction field effect transistor (JFET), according to some embodiments of the present disclosure.
Figure 1B:
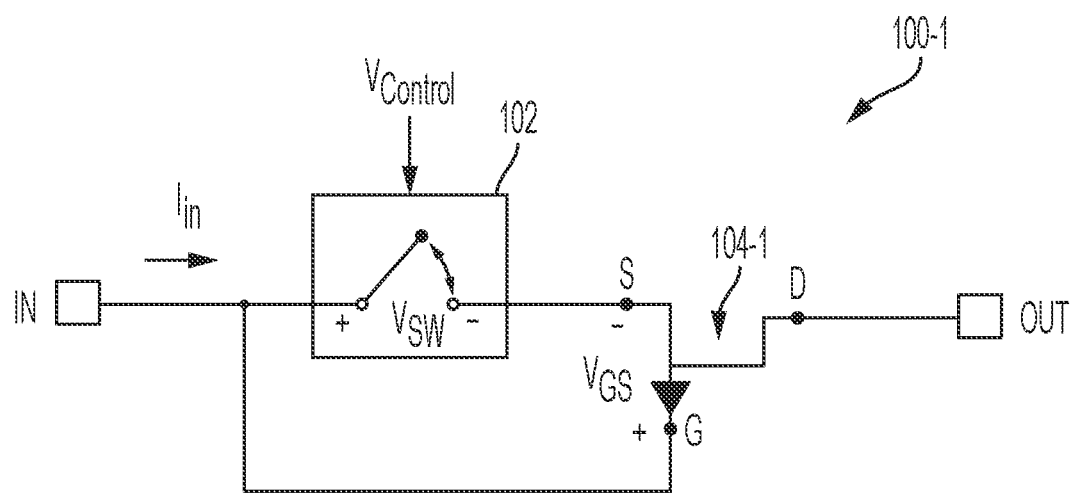
FIG. 1B illustrates a high-voltage electromechanical switching protection system including a p-channel JFET, according to some embodiments of the present disclosure.

FIG. 1A illustrates a high-voltage electromechanical switching protection system 100 including an n-channel JFET, according to some embodiments of the present disclosure. FIG. 1B illustrates a high-voltage electromechanical switching protection system 100-1 including a p-channel JFET, according to some embodiments of the present disclosure.

Referring to FIG. 1A, the electromechanical switching protection system 100 is a 3-terminal device with an input terminal IN, an output terminal OUT, and a switch-control terminal CNTRL. In some embodiments, the electromechanical switching protection system 100 includes an electromechanical switchgear 102 and a JFET device 104 that is electrically connected in series with the contacts of the electromechanical switchgear 102 forming a single conductive path between the input terminal IN and the output terminal OUT of the electromechanical switching protection system 100.

According to some embodiments, the electromechanical switchgear 102 includes contacts that are configured to selectively close to allow electrical current to pass through, and open to prevent passage of current through the electromechanical switchgear 102, in response to a control signal (e.g., an external control signal) $V_{Control}$. The electromechanical switchgear 102 may be, for example, an electromechanical switch/relay or a contactor, which uses an electromagnet to open/close the contacts of the electromechanical switchgear 102 based on the control signal $V_{Control}$. In some examples, the electromechanical switchgear 102 may include a number of sets of contacts that are connected in parallel to one another (e.g., as in a plurality of parallel relays) and are all controlled by the same control signal $V_{Control}$.

The input terminal IN may be electrically connected to a power source (e.g., a voltage or current source) and the output terminal may be coupled to an electrical load 110. The input voltage Vin at the input terminal IN may be as high as the maximum drain to source operating voltage rating of the JFET device 104, and the input current $I_{in}$ (or equivalently, load current $I_{Load}$) may be as high as the maximum drain current rating of the JFET device 104.

In some embodiments, the JFET device 104 includes an n-channel JFET having its gate G connected to the output terminal of the electromechanical switching protection system 100. In this configuration, the JFET device 104 may be connected between the input terminal and the electromechanical switchgear 102. The JFET device 104 is a voltage-controlled device that is activated (e.g., turned ON) when the gate-source voltage $V_{GS}$ is at about 0 V, and is deactivated (e.g., turned OFF) when a voltage with proper polarity is applied between the gate G and source S terminals of the JFET device 104. In some examples, the JFET device 104 is deactivated when the gate-source voltage $V_{GS}$ becomes negative (i.e., when the voltage drop $V_{SW}$ across the electromechanical switchgear 102 becomes positive).

Referring now to FIG. 1B, in some embodiments, the JFET device 104-1 includes a p-channel JFET having its gate G connected to the input terminal of the electromechanical switching protection system 100. In this configuration, the JFET device 104-1 may be connected between the electromechanical switchgear 102 and the output terminal. Here, the JFET device 104-1 is activated (e.g., turned ON) when the gate-source voltage $V_{GS}$ is at about 0 V, and is deactivated (e.g., turned OFF) when the gate-source voltage $V_{GS}$ becomes positive (i.e., when the voltage drop $V_{SW}$ across the electromechanical switchgear 102 becomes positive).

Figure 2A:
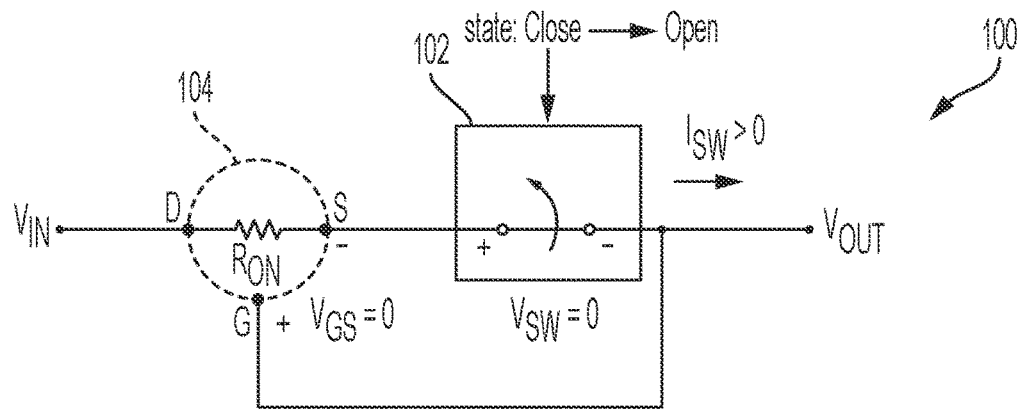
FIGS. 2A-2C illustrate the response of the JFET to the opening of the switchgear, which is initially in a closed state, according to some embodiments of the present disclosure.
Figure 2B:
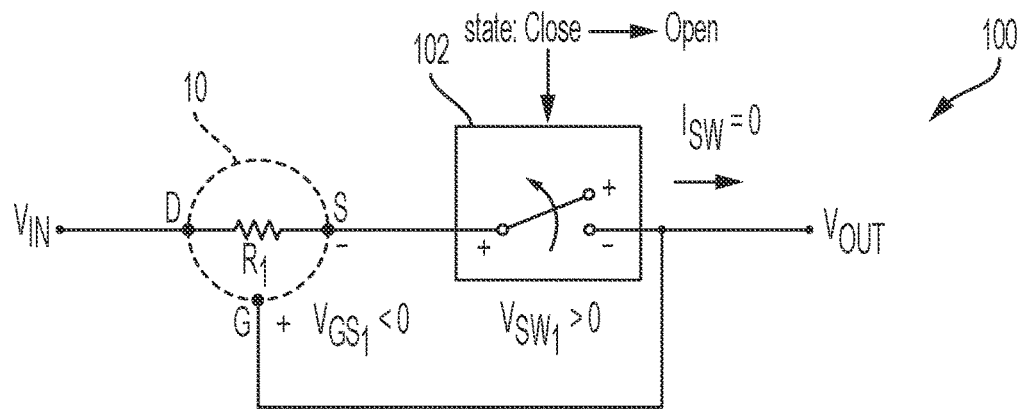
Figure 2C:
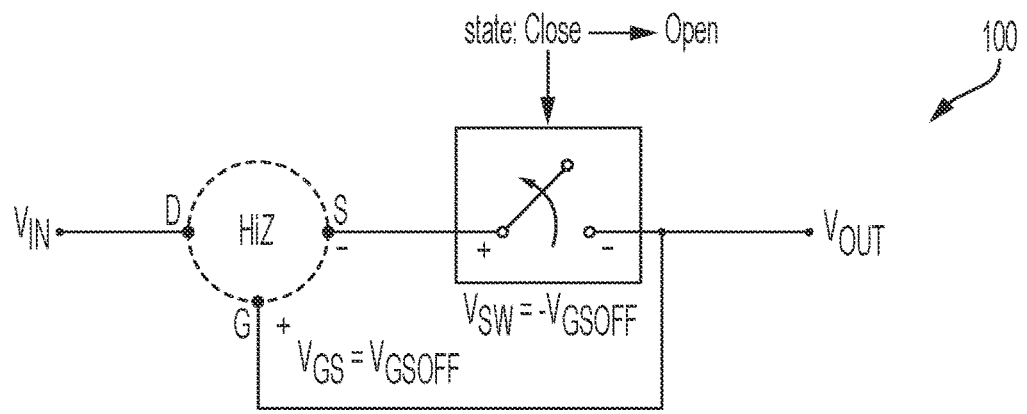

FIGS. 2A-2C illustrate the response of the JFET device 104 to the opening of the electromechanical switchgear 102, which is initially in a closed state, according to some embodiments of the present disclosure.

Referring to FIG. 2A, when the electromechanical switchgear 102 is initially closed, the voltage drop $V_{SW}$ across the electromechanical switchgear 102 is substantially zero, which causes the JFET device 104 to be activated (e.g., turned ON) because the gate-source voltage $V_{GS}$ is at about 0 V. Here, the JFET device 104 may be represented with a small on-resistance $R_{ON}$. In some examples, the on-resistance $R_{ON}$ of the JFET device 104 may be about 7 ms) to about 10 ms).

As shown in FIG. 2B, when an appropriate control signal is applied to the control terminal of the electromechanical switching protection system 100 to open the electromechanical switchgear 102, the contacts of the electromechanical switchgear 102 begin to separate and a voltage $V_{SW1}$ begins to develop across the contacts of the electromechanical switchgear 102, which drives the gate-source voltage $V_{GS}$ to the negative territory as $$V_{GS1} = -V_{SW1}$$

This in turn, begins to deactivate the JFET device 104 by increasing its drain-to-source resistance $R_{DS}$ (e.g., to a value of $R_1$). As such, the voltage drop across the JFET device 104 (i.e., the drain-source voltage) increases, which limits the voltage drop $V_{SW1}$ across the electromechanical switchgear 102.

This continues until the gate-source voltage $V_{GS}$ becomes sufficiently negative (e.g., equal to the gate-source off-voltage $V_{GSOFF}$) to pinch the gate, resulting in high impedance (HiZ) across the JFET device 104, as shown in FIG. 2C, which limits the current flow through the system.

According to some embodiments, because the impedance of the JFET device 104 in the deactivated state (i.e., its off-resistance) and the voltage rating of the JFET device 104 are substantially higher than those of the electromechanical switchgear 102, the negative feedback behavior inherent in the JFET device 104 may limit the amount of voltage across the contacts of the electromechanical switchgear 102 to a maximum voltage approximately equal to the gate-source off-voltage $V_{GSOFF}$, which may be about 10 V to about 12 V. This reduction of open contacts voltage coupled with the reduction in current by the JFET device 104 provides contact protection against severe fretting and prevents sustained arcing thus protecting the electromechanical switchgear 102.

Figure 3A:
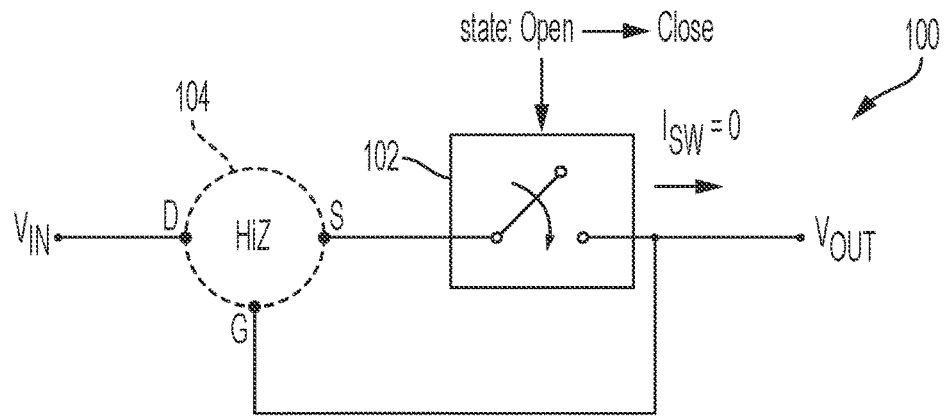
FIGS. 3A-3C illustrate the response of the JFET to the closing of the switchgear, which is initially in an open state, according to some embodiments of the present disclosure.
Figure 3B:
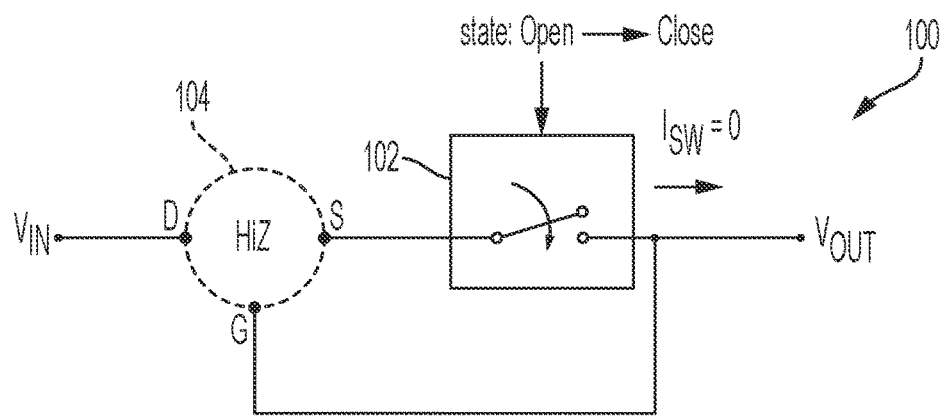
Figure 3C:
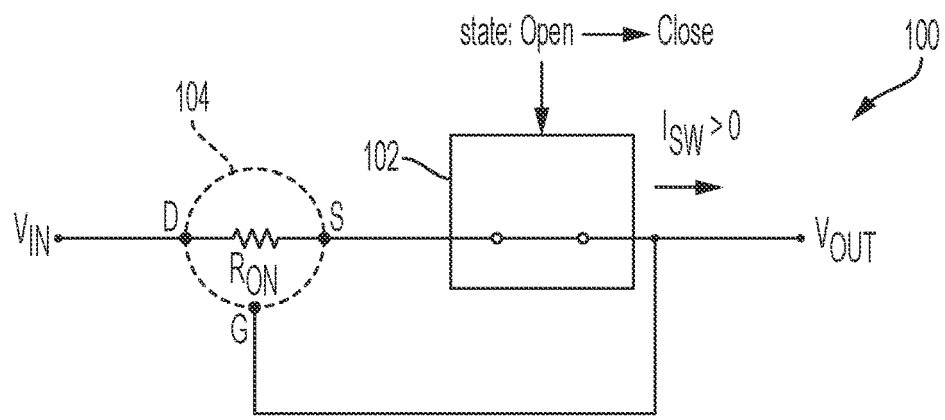

FIGS. 3A-3C illustrate the response of the JFET device 104 to the closing of the electromechanical switchgear 102, which is initially in an open state, according to some embodiments of the present disclosure.

Referring to FIG. 3A, when the electromechanical switchgear 102 is initially open, the gate of the JFET device 104 is at a lower voltage than the source, causing the JFET to be deactivated and in a high-impedance state (e.g., turned OFF) and maintaining the low voltage across the switch gear terminals equal to $V_{GSOFF}$.

As shown in FIG. 3B, when an appropriate control signal is applied to the control terminal of the electromechanical switching protection system 100 to close the electromechanical switchgear 102, the contacts of the switchgear 102 come together while the voltage drop $V_{SW}$ is small, due to the JFET device 104 being deactivated and in a high-impedance state prior to the closing. Therefore, during the closing of the electromechanical switchgear 102, the switchgear contacts are not subjected to high voltage as they come together to form an electrical connection, thus mitigating the arcing across them. The JFET device 104 remains in the high-impedance state until the contacts are closed. In some examples, the JFET device 104 may be rated for up to 1200 V to accompany and enhance a low voltage electromechanical switchgear 102 that is rated at 28 V to be used in 120 V, 270 V or 600 V applications.

As shown in FIG. 3C, after the electromechanical switchgear 102 is closed, the voltage across the switchgear 102, and thus the gate and source of the JFET device 104, becomes zero, which causes the JFET device 104 to be activated (e.g., turned ON) and allows current to flow through the electromechanical switchgear 102.

Accordingly, the absence of an electric arc at time of closing and opening, reduces contact wear and corrosion damage at the asperities of the contact surfaces that would otherwise occur without the use of the series-connected JFET device 104. As a result, the lifespan of the electromechanical switchgear 102 may be prolonged, thus improving system reliability and reducing the cost of deploying the electromechanical switching protection system 100 in power distribution systems.

Further, the relatively small-footprint and relatively high voltage rating of the JFET device 104 allows the electromechanical switching protection system 100 to be utilized in space-constrained and high voltage applications. According to some embodiments, the JFET device 104 allows a low-voltage rating switchgear (e.g., with a rating of 28 V) to be used in a high-voltage application (e.g., a 270 V application), thus effectively increasing the power-rating of the electromechanical switching protection system 100. As the size and cost of the switchgear can significantly increase for higher voltage ratings, by utilizing the JFET device 104, the electromechanical switching protection system 100 may provide the performance of a high-voltage rating switchgear of the related art, but at a fraction of the footprint and cost of the related art solutions. Here, it is noted that, in many high-voltage applications, replacing the electromechanical switching protection system 100 with a standalone JFET device would be undesirable. In part, this is due to the fact that the leakage current from the drain to source of the JFET, when used as a standalone switch, is substantially higher than the leakage current from the drain to gate of the JFET device, when it is connected according to some embodiments of the present disclosure. Further, this is also due to the fact that the gate driver or control circuit for controlling the JFET may be referenced to the source of the JFET and therefore would be exposed to the high switching voltage (e.g., 270 V), which may damage the gate driver or control circuit. In contrast, an electromechanical switchgear may be controlled by a low voltage coil (e.g., a 28 V coil). This control mechanism is galvanically isolated from the contacts and the current path of the switchgear. Utilizing the JFET in the electromechanical switching protection system allows for the control of the switchgear with an existing low voltage control interface, thus avoiding a mix of high and low voltage circuits, which can greatly reduce complexity and cost of the overall system. In addition, the status of a switchgear's switching may be provided through the auxiliary contacts of the switchgear, which are also isolated from the main contacts that are exposed to high voltages.

Furthermore, the electromechanical switching protection system 100 according to some embodiments, does not require any additional active control circuitry for controlling the on/off state of the JFET device 104, as the JFET device 104 is automatically and passively controlled by the voltage developed across the electromechanical switchgear 102. This reduces the overall complexity, and brings down the cost, of the system as compared to the related art.

While aspects of the present disclosure have been described with reference to an electromechanical switchgear, embodiments of the present disclosure are not limited thereto. For example, the electromechanical switchgear 102 may be replaced with any suitable low-voltage, active or passive protection circuit (e.g., circuit breakers or fuses), as shown in FIGS. 4A-4B.

Figure 4A:
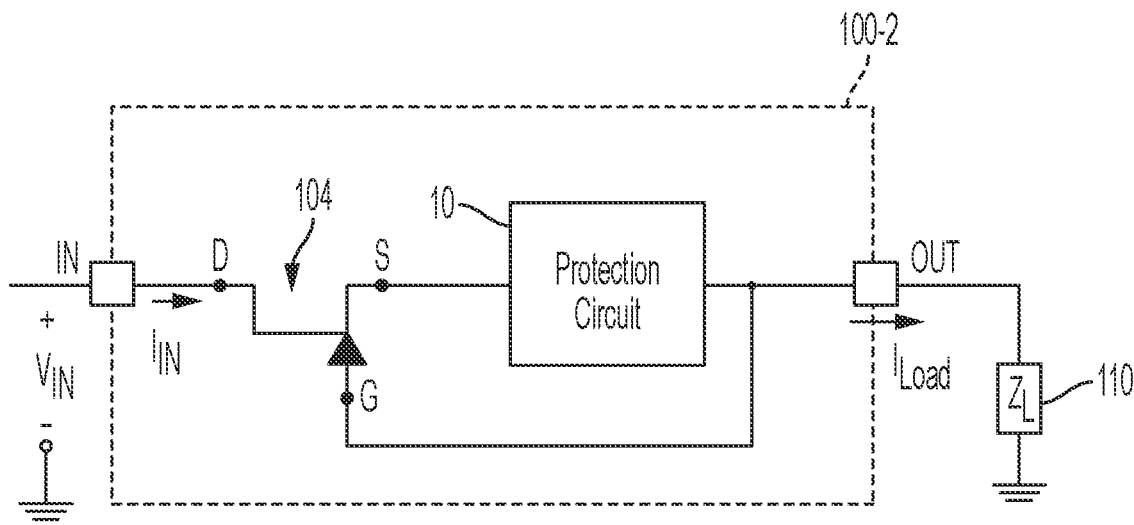
FIG. 4A illustrates a high-voltage electromechanical switching protection system utilizing an electromechanical protection circuit and an n-channel JFET, according to some embodiments of the present disclosure.
Figure 4B:
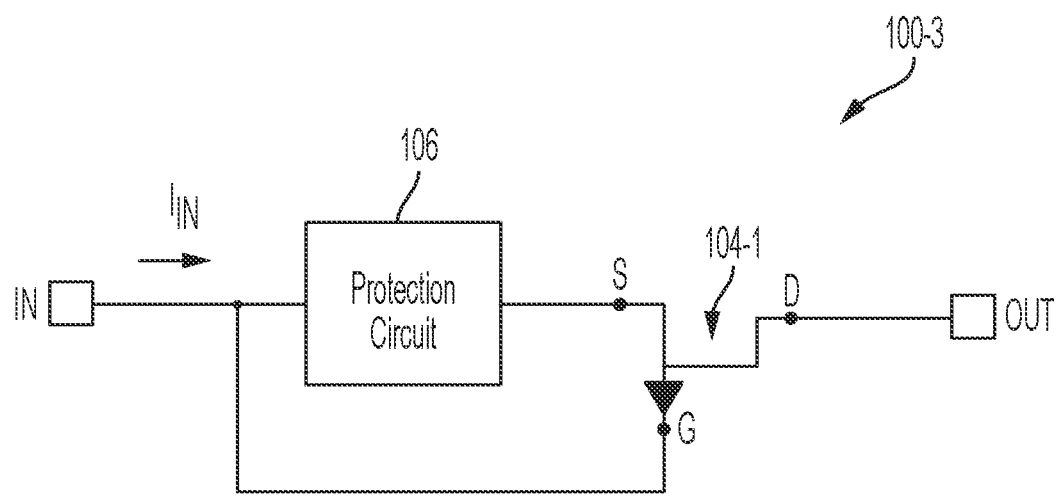
FIG. 4B illustrates a high-voltage electromechanical switching protection system utilizing an electromechanical protection circuit and a p-channel JFET, according to some embodiments of the present disclosure.

FIG. 4A illustrates a high-voltage electromechanical switching protection system 100-2 utilizing an electromechanical protection circuit 106 and an n-channel JFET, according to some embodiments of the present disclosure. FIG. 4B illustrates a high-voltage electromechanical switching protection system 100-3 utilizing an electromechanical protection circuit 106 and a p-channel JFET, according to some embodiments of the present disclosure.

In such embodiments, the electromechanical protections circuit 106 may be configured to protect an electrical load from damage caused by excess current from an overload or a short circuit. In other words, the electromechanical protection circuit 106 interrupts current flow in response to a fault is detected. In some examples, the electromechanical protection circuit 106 may be a circuit breaker (e.g., a thermal or remotely controlled circuit breaker), a fuse (e.g., a one-time fuse or a resettable fuse), or the like. Similar to the embodiments of FIGS. 1A-1B, here, the voltage across the electromechanical protections circuit 106 serves to control the state of the JFET device 104, which effectively increases the voltage rating of the electromechanical protection circuit 106. As the operation of the electromechanical switching protection systems 100-2 and 1003 are substantially similar to those of systems 100 and 100-1, a detailed description thereof will not be repeated.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the inventive concept". Also, the term "exemplary" is intended to refer to an example or illustration.

It will be understood that, although the terms "first", "second", "third", etc., may be used herein to describe various elements, components, and/or sections, these elements, components, and/or sections should not be limited by these terms. These terms are used to distinguish one element, component, or section from another element, component, or section. Thus, a first element, component, or section discussed below could be termed a second element, component, or section, without departing from the scope of the inventive concept.

It will be understood that when an element is referred to as being "connected to" or "coupled to" another element, it can be directly connected to or coupled to the other element, or one or more intervening elements may be present. When an element is referred to as being "directly connected to" or "directly coupled to" another element, there are no intervening elements present.

As used herein, the terms "use", "using", and "used" may be considered synonymous with the terms "utilize", "utilizing", and "utilized", respectively.

While this disclosure has been described in detail with particular references to illustrative embodiments thereof, the embodiments described herein are not intended to be exhaustive or to limit the scope of the disclosure to the exact forms disclosed. Persons skilled in the art and technology to which this disclosure pertains will appreciate that alterations and changes in the described structures and methods of assembly and operation can be practiced without meaningfully departing from the principles, and scope of this disclosure, as set forth in the following claims and equivalents thereof.

What is claimed is:

1. An electromechanical switching protection system comprising:
   an electromechanical switchgear having contacts configured to selectively open and close via an electromagnet in response to a control signal, the contacts of the electromechanical switchgear being galvanically isolated from a source of the control signal; and
   a junction field effect transistor (JFET) device electrically connected in series with the electromechanical switchgear between an input terminal and an output terminal of the electromechanical switching protection system, a gate of the JFET device being electrically connected to the output terminal and directly connected to a contact of the contacts of the electromechanical switchgear.

2. The electromechanical switching protection system of claim 1, wherein the JFET device is configured to reduce electrical arcing across the contacts of the electromechanical switchgear when opening or closing.

3. The electromechanical switching protection system of claim 1, wherein the JFET device is configured to limit a voltage across the contacts of the electromechanical switchgear to a gate-source off-voltage of the JFET device.

4. The electromechanical switching protection system of claim 1, wherein the JFET device is configured to be activated prior to the contacts of the electromechanical switchgear being opened, and to be deactivated after the contacts of the electromechanical switchgear are opened.

5. The electromechanical switching protection system of claim 1, wherein the JFET device is configured to be deactivated prior to the contacts of the electromechanical switchgear being closed, and to be activated after the contacts of the electromechanical switchgear are closed.

6. The electromechanical switching protection system of claim 1, wherein the JFET device comprises an N-channel JFET.

7. The electromechanical switching protection system of claim 1, wherein the JFET device has a higher voltage rating than the electromechanical switchgear.

8. An electromechanical switching protection system comprising:
   an electromechanical switchgear having contacts configured to selectively open and close via an electromagnet in response to a control signal, the contacts of the electromechanical switchgear being galvanically isolated from a source of the control signal; and
   a junction field effect transistor (JFET) device electrically connected in series with the electromechanical switchgear between an input terminal and an output terminal of the electromechanical switching protection system, a gate of the JFET device being electrically connected to the input terminal and directly connected to a contact of the contacts of the electromechanical switchgear.

9. The electromechanical switching protection system of claim 8, wherein the JFET device is configured to reduce electrical arcing across the contacts of the electromechanical switchgear when opening or closing.

10. The electromechanical switching protection system of claim 8, wherein the JFET device is configured to limit a voltage across the contacts of the electromechanical switchgear to a gate-source off-voltage of the JFET device.

11. The electromechanical switching protection system of claim 8, wherein the JFET device is configured to be activated prior to the contacts of the electromechanical switchgear being opened, and to be deactivated after the contacts of the electromechanical switchgear are opened.

12. The electromechanical switching protection system of claim 8, wherein the JFET device is configured to be deactivated prior to the contacts of the electromechanical switchgear being closed, and to be activated after the contacts of the electromechanical switchgear are closed.

13. The electromechanical switching protection system of claim 8, wherein the JFET device comprises a P-channel JFET.

14. The electromechanical switching protection system of claim 8, wherein the JFET device has a higher voltage rating than the electromechanical switchgear.

\* \* \* \* \*